US011491840B2

United States Patent
Yamahata et al.

(10) Patent No.: US 11,491,840 B2
(45) Date of Patent: Nov. 8, 2022

(54) SUSPENSION DEVICE

(71) Applicant: Hitachi Astemo, Ltd., Hitachinaka (JP)

(72) Inventors: Masatoshi Yamahata, Chigasaki (JP); Yuki Yoshida, Atsugi (JP); Nobuyuki Ichimaru, Yokohama (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 17/271,007

(22) PCT Filed: Aug. 15, 2019

(86) PCT No.: PCT/JP2019/032003
§ 371 (c)(1),
(2) Date: Feb. 24, 2021

(87) PCT Pub. No.: WO2020/045097
PCT Pub. Date: Mar. 5, 2020

(65) Prior Publication Data
US 2021/0323368 A1 Oct. 21, 2021

(30) Foreign Application Priority Data
Aug. 29, 2018 (JP) .............................. JP2018-160619

(51) Int. Cl.
*B60G 17/015* (2006.01)
*B60G 17/052* (2006.01)

(52) U.S. Cl.
CPC ......... *B60G 17/015* (2013.01); *B60G 17/052* (2013.01); *B60G 2202/152* (2013.01); *B60G 2400/25* (2013.01); *B60G 2500/205* (2013.01)

(58) Field of Classification Search
None
See application file for complete search history.

(56) References Cited

U.S. PATENT DOCUMENTS 4,834,418 A * 5/1989 Burna ................ B60G 17/0155
280/5.506
7,600,762 B2 * 10/2009 Yasui ................ B60G 21/0555
280/5.512

(Continued)

FOREIGN PATENT DOCUMENTS

EP          3225483 A1 * 10/2017  ............ B60T 13/268
JP          60-248413      12/1985
(Continued)

OTHER PUBLICATIONS

International Search Report dated Oct. 8, 2019 in International Application No. PCT/JP2019/032003, with English translation.

(Continued)

*Primary Examiner* — Faye M Fleming
(74) *Attorney, Agent, or Firm* — Wenderoth, Lind & Ponack, L.L.P.

(57) ABSTRACT

When a vehicle's driving situation is a rolling state, a compressor is used to transfer compressed air between left and right air suspensions of front wheels, and a compressor is used to transfer compressed air between left and right air suspensions of rear wheels. The air suspensions of the left and right front wheels and the air suspensions of the left and rear wheels thus independently generate counter rolls. This makes it possible to concurrently perform vehicle height adjustment of the air suspensions of the left and right front wheels and vehicle height adjustment of the air suspensions of the left and right rear wheels, which improves responsiveness in counter roll control.

5 Claims, 16 Drawing Sheets

(56) References Cited

U.S. PATENT DOCUMENTS

| | | | |
|---|---|---|---|
| 10,266,028 B2 * | 4/2019 | Mettrick | B60G 17/0163 |
| 2002/0136645 A1 | 9/2002 | Folchert et al. | |
| 2018/0029432 A1 | 2/2018 | Kondo et al. | |
| 2020/0207176 A1 * | 7/2020 | Baker | B60G 17/0525 |

FOREIGN PATENT DOCUMENTS

| | | | |
|---|---|---|---|
| JP | 2002-337531 | | 11/2002 |
| JP | 2009-255779 | | 11/2009 |
| JP | 2009255779 A | * | 11/2009 |
| JP | 2010-64589 | | 3/2010 |
| JP | 2015081612 A | * | 4/2015 |
| JP | 2018-16187 | | 2/2018 |

OTHER PUBLICATIONS

Written Opinion of the International Searching Authority dated Oct. 8, 2019 in International (PCT) Application No. PCT/JP2019/032003, with English translation.
Office Action dated Jun. 27, 2022 in corresponding Korean Patent Application No. 10-2021-7006151, with English translation.

* cited by examiner

SUSPENSION DEVICE

TECHNICAL FIELD

The invention relates to a suspension device provided, for example, in a four-wheel automobile or the like and configured to adjust vehicle height by controlling the supply and exhaust of compressed air to and from an air suspension of each wheel.

BACKGROUND ART

Patent Document 1 discloses a suspension device configured to adjust vehicle height by controlling the supply and exhaust compressed air to and from an air suspension provided to each wheel. According to this suspension device, when the air suspension of a front wheel comes into communication with the air suspension of a rear wheel, pressure (compressed air) escapes from the air suspension having relatively high pressure to the air suspension having low pressure. The suspension device therefore requires the air suspensions of the front and rear wheels to be alternately adjusted.

CITATION LIST

Patent Literature

PTL 1: Japanese Unexamined Patent Application Publication (Kokai) No. 2002-337531

SUMMARY OF INVENTION

Technical Problem

In some vehicles, so-called counter roll control is used, which inclines a vehicle body in a counter direction to an actual roll direction during turning. If the counter roll control is performed in the suspension device described in Patent Document 1, there is a problem with responsiveness due to the necessity of alternate vehicle height adjustment in the air suspensions of the front and rear wheels.

Solution to Problem

An object of the invention is to improve responsiveness during counter roll control.

A suspension device according to one embodiment of the invention comprises a front wheel-side left air suspension, a front wheel-side right air suspension, a rear wheel-side left air suspension, a rear wheel-side right air suspension, and a compressor configured to supply compressed air to the front wheel left air suspension, the front wheel right air suspension, the rear wheel left air suspension, and the rear wheel-side right air suspension. The compressor is used to transfer compressed air between the front wheel-side left air suspension and the front wheel-side right air suspension and transfer compressed air between the rear wheel-side left air suspension and the rear wheel-side right air suspension so that, when a vehicle's driving situation is a rolling state, the front wheel-side left and right air suspensions and the rear wheel-side left and right air suspensions independently generate counter rolls.

The suspension device according to the one embodiment of the invention improves responsiveness during counter roll control.

BRIEF DESCRIPTION OF DRAWINGS

FIG. 3 is an explanatory diagram of the first embodiment which shows a diagram of the pneumatic system where vehicle height adjustment (raising) of air suspensions of left and right wheels is finished earlier while the simultaneous mode is on.

DESCRIPTION OF EMBODIMENTS (First Embodiment) A first embodiment of the invention will be discussed with reference to the attached drawings.

The following discussion refers to a case where a suspension device 1 according to the first embodiment is applied to a four-wheel automobile (vehicle). The suspension device 1 includes a suspension control device, not shown, comprising an ECU (Electronic Control Unit). The suspension control device controls the driving of each control valve and the activation of a compressor 8 (first compressor) and a compressor 9 (second compressor) which will be explained later.

Figure 1:
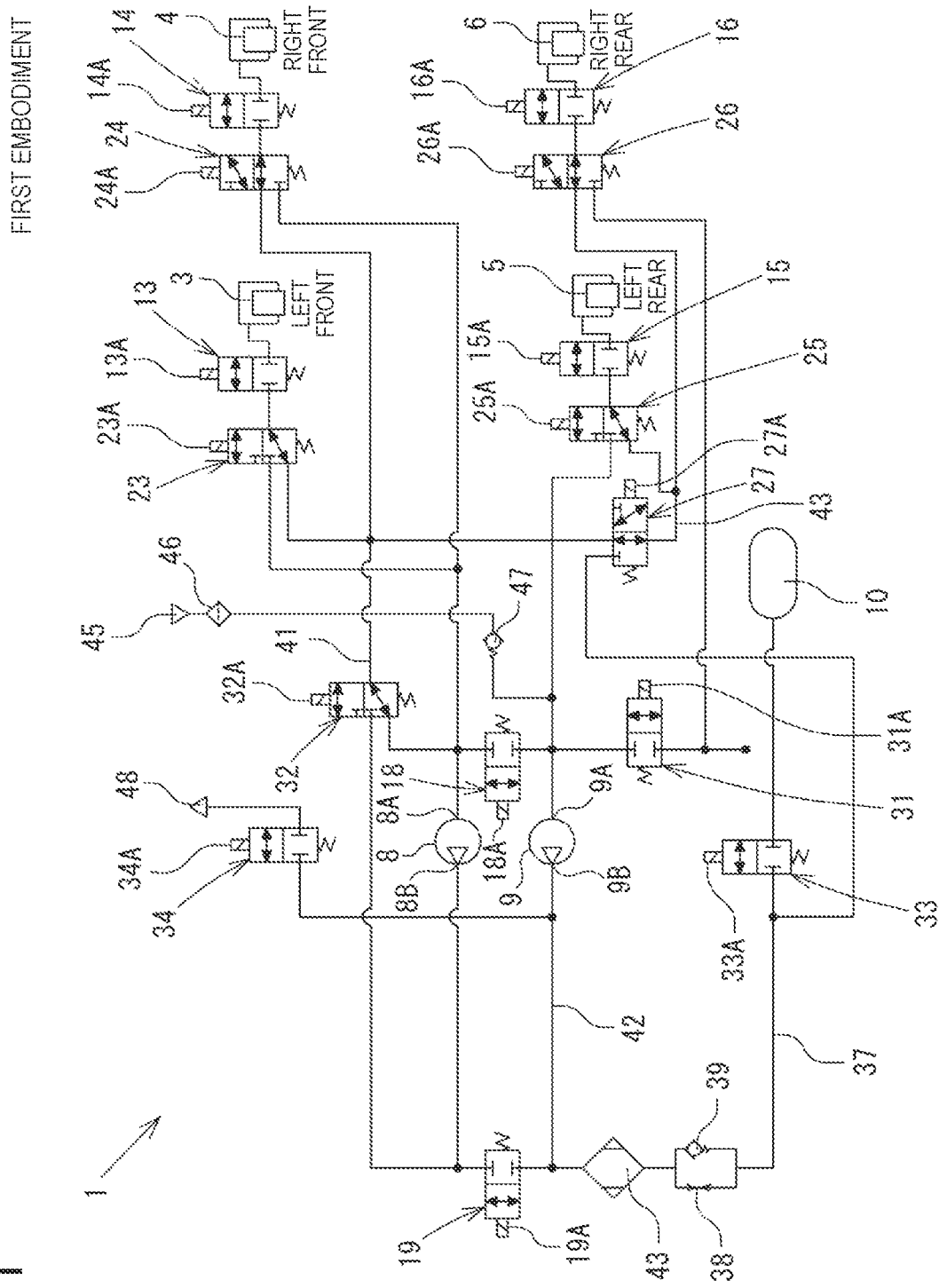
FIG. 1 is a pneumatic system diagram of a suspension device according to a first embodiment.

Referring to FIG. 1, the suspension device 1 comprises an air suspension 3 interposed between a vehicle body and a left front wheel, an air suspension 4 interposed between the vehicle body and a right front wheel, an air suspension 5 interposed between the vehicle body and a left rear wheel, and an air suspension 6 interposed between the vehicle body and a right rear wheel. A pneumatic system of the suspension device 1 which includes the air suspensions 3 and 4 of the left and right front wheels (front wheel-side left and right air suspensions) and the air suspensions 5 and 6 of the left and right rear wheels (rear wheel-side left and right air suspensions) comprises a closed circuit in which compressed air accumulated in a pressure accumulator 10 is used as hydraulic fluid.

The suspension device 1 comprises a control valve 13 that is driven by a solenoid 13A and controls supply and exhaust of compressed air with respect to the air suspension 3 of the left front wheel, a control valve 14 that is driven by a solenoid 14A and controls supply and exhaust of compressed air with respect to the air suspension 4 of the right front wheel, a control valve 15 that is driven by a solenoid 15A and controls supply and exhaust of compressed air with respect to the air suspension 5 of the left rear wheel, and a control valve 16 that is driven by a solenoid 16A and controls supply and exhaust of compressed air with respect to the air suspension 6 of the right rear wheel.

The suspension device 1 has a simultaneous mode that raises the air suspensions 3 and 4 of the left and right front wheels and the air suspensions 5 and 6 of the left and right rear wheels simultaneously by using respective compressors 8 and 9, alternate modes that raise/lower the air suspensions 3 and 4 of the left and right front wheels and the air suspensions 5 and 6 of the left and right rear wheels alternately using the two compressors 8 and 9, and a counter roll mode that transfers compressed air between the left and right air suspensions 3 and 4 on the front side and between the left and right air suspensions 5 and 6 on the rear side using the respective compressors 8 and 9 so that, when a vehicle's driving situation is a rolling state, the air suspensions 3 and 4 of the left and right front wheels and the air suspensions 5 and 6 of the left and right rear wheels independently provide counter rolls.

Each of control modes including the simultaneous mode, the alternate modes, and the counter roll mode is selected by switching control valves 23, 24, 25, 26 and 27 disposed in the pneumatic system shown in FIG. 1. Used as the control valves 23, 24, 25, 26 and 27 are solenoid valves (direction control valves) of the same type.

The suspension device 1 includes control valves 18 and 19 that are switched when a selection is made whether the air supply and exhaust with respect to the air suspensions 3 and 4 of the left and right front wheels are performed using the compressor 8 only or the two compressors 8 and 9 and whether the air supply and exhaust with respect to the air suspensions 5 and 6 of the left and right rear wheels are performed using the compressor 9 only or the two compressors 8 and 9. The control valve 18 is driven by a solenoid 18A and controls communication/disconnection between an air supply port 8A of the compressor 8 and an air supply portion 9A of the compressor 9. The control valve 19 is driven by a solenoid 19A and controls communication/disconnection between an air exhaust port 8B of the compressor 8 and an air exhaust port 9B of the compressor 9. Used as the control valves 18 and 19 are solenoid valves (direction control valves) of the same type.

The suspension device 1 includes a control valve 31 that is driven by a solenoid 31A and controls communication/disconnection between the pressure accumulator 10 and the air supply port 9A of the compressor 9. The suspension device 1 further includes a control valve 32. The control valve 32 is driven by a solenoid 32A and switches a duct line 41 on the air suspensions 3, 4, 5 and 6 side between connection for communication with the air supply port 8A of the compressor 8 and connection for communication with the air exhaust port 8B of the compressor 8.

The suspension device 1 includes a control valve 33 that is driven by a solenoid 33A and controls communication/disconnection between the air exhaust port 9B of the compressor 9 and the pressure accumulator 10. The suspension device 1 further includes a control valve 34 that is driven by a solenoid 34A and controls communication/disconnection between an air outlet 48 and a duct line 42 with one end connected to the air exhaust port 9B of the compressor 9. A dryer 43 is provided in a duct line 37 extending between the other end of the duct line 42 and a control valve 33. A throttle valve 38 and a check valve 39 are provided in parallel in the duct line 37.

Figure 2:
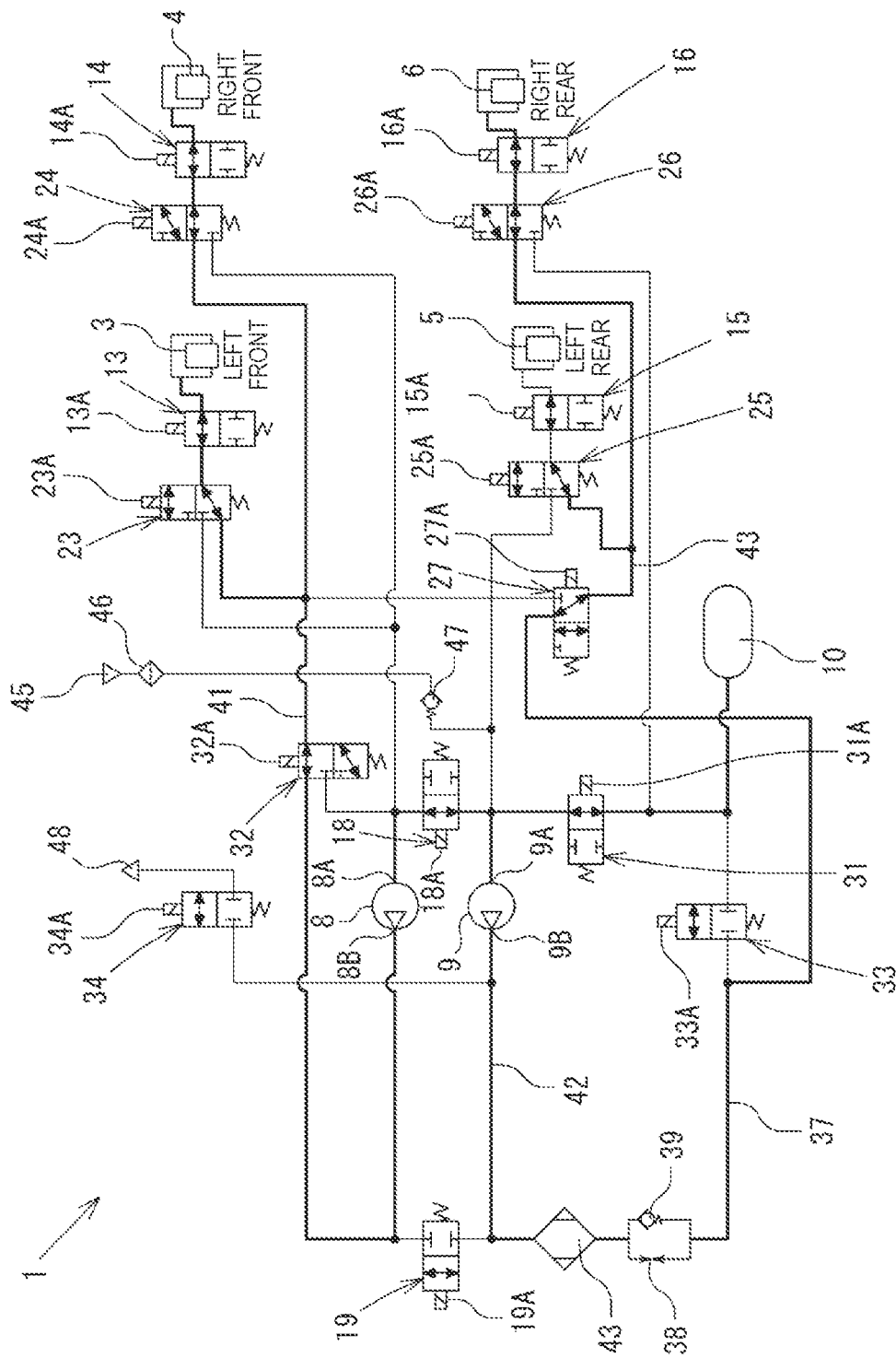
FIG. 2 is an explanatory diagram of the first embodiment which shows a diagram of the pneumatic system in a simultaneous mode.

FIG. 2 is a diagram of the pneumatic system in the simultaneous mode. The simultaneous mode forms a pneumatic system that supplies air to the air suspensions 3 and 4 of the left and right front wheels using the compressor 8 and a pneumatic system that supplies air to air suspensions 5 and 6 of the left and right rear wheels using the compressor 9. The simultaneous mode energizes the solenoid 31A of the control valve 31 and the solenoid 18A of the control valve 18 to bring the air supply port 8A of the compressor 8 and the air supply port 9A of the compressor 9 into communication with the pressure accumulator 10.

In the simultaneous mode, the solenoid 19A of the control valve 19 is de-energized to disconnect the air exhaust port 8B of the compressor 8 and the air exhaust port 9B of the compressor 9 from each other. The solenoid 32A of the control valve 32, the solenoid 13A of the control valve 13, and the solenoid 14A of the control valve 14 are energized, whereas a solenoid 23A of the control valve 23 and a solenoid 24A of the control valve 24 are de-energized to bring the air exhaust port 8B of the compressor 8 into communication with the air suspensions 3 and 4. Compressed air that is pumped from the compressor 8 is thus supplied to the air suspensions 3 and 4 of the left and right front wheels, which raises vehicle height of the air suspensions 3 and 4.

Meanwhile, in the simultaneous mode, a solenoid 27A of the control valve 27, the solenoid 15A of the control valve 15, and the solenoid 16A of the control valve 16 are energized, whereas the solenoid 33A of the control valve 33, the solenoid 25A of the control valve 25, and a solenoid 26A of the control valve 26 are de-energized to bring the air exhaust port 9B of the compressor 9 into communication with the air suspensions 5 and 6. Compressed air that is pumped from the compressor 9 is then supplied to the air suspensions 5 and 6 of the left and right rear wheels, which raises vehicle height of the air suspensions 5 and 6.

Figure 3:
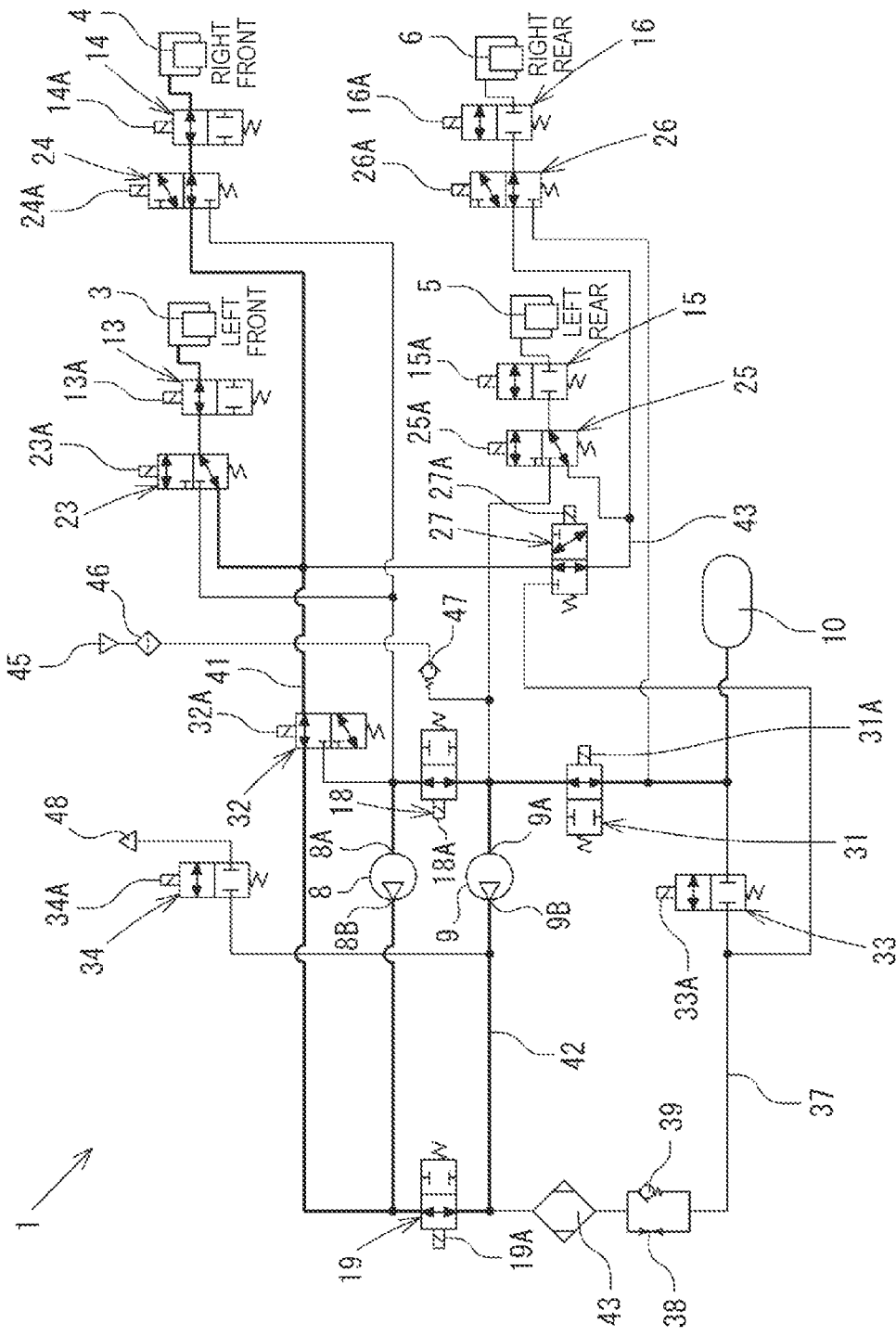

If vehicle height adjustment (raising) of the air suspensions 5 and 6 of the left and right rear wheels is finished earlier, the solenoid 15A of the control valve 15 and the solenoid 16A of the control valve 16 are de-energized to disconnect the compressed air supply to the air suspensions 5 and 6 of the left and right rear wheels, and the solenoid 19A of the control valve 19 is energized to bring the air exhaust port 8B of the compressor 8 and the air exhaust port 9B of the compressor 9 into communication with each other, as shown in FIG. 3. The air suspensions 3 and 4 of the left and right front wheels are thus supplied with the compressed air that is pumped from the compressor 8 and the compressed air that is pumped from the compressor 9. This increases speed of the rest of the raising motion of the air suspensions 3 and 4 of the left and right front wheels.

If vehicle height adjustment (raising) of the air suspensions 3 and 4 of the left and right front wheels is finished earlier, the solenoid 13A of the control valve 13 and the solenoid 14A of the control valve 14 are de-energized to disconnect the compressed air supply to the air suspensions 3 and 4 of the left and right front wheels, and the solenoid 19A of the control valve 19 is energized to bring the air exhaust port 8B of the compressor 8 and the air exhaust port 9B of the compressor 9 into communication with each other. The air suspensions 5 and 6 of the left and right rear wheels are thus supplied with the compressed air that is pumped from the compressor 8 and the compressed air that is pumped from the compressor 9. This increases speed of the rest of the raising motion of the air suspensions 5 and 6 of the left and right rear wheels.

Figure 4:
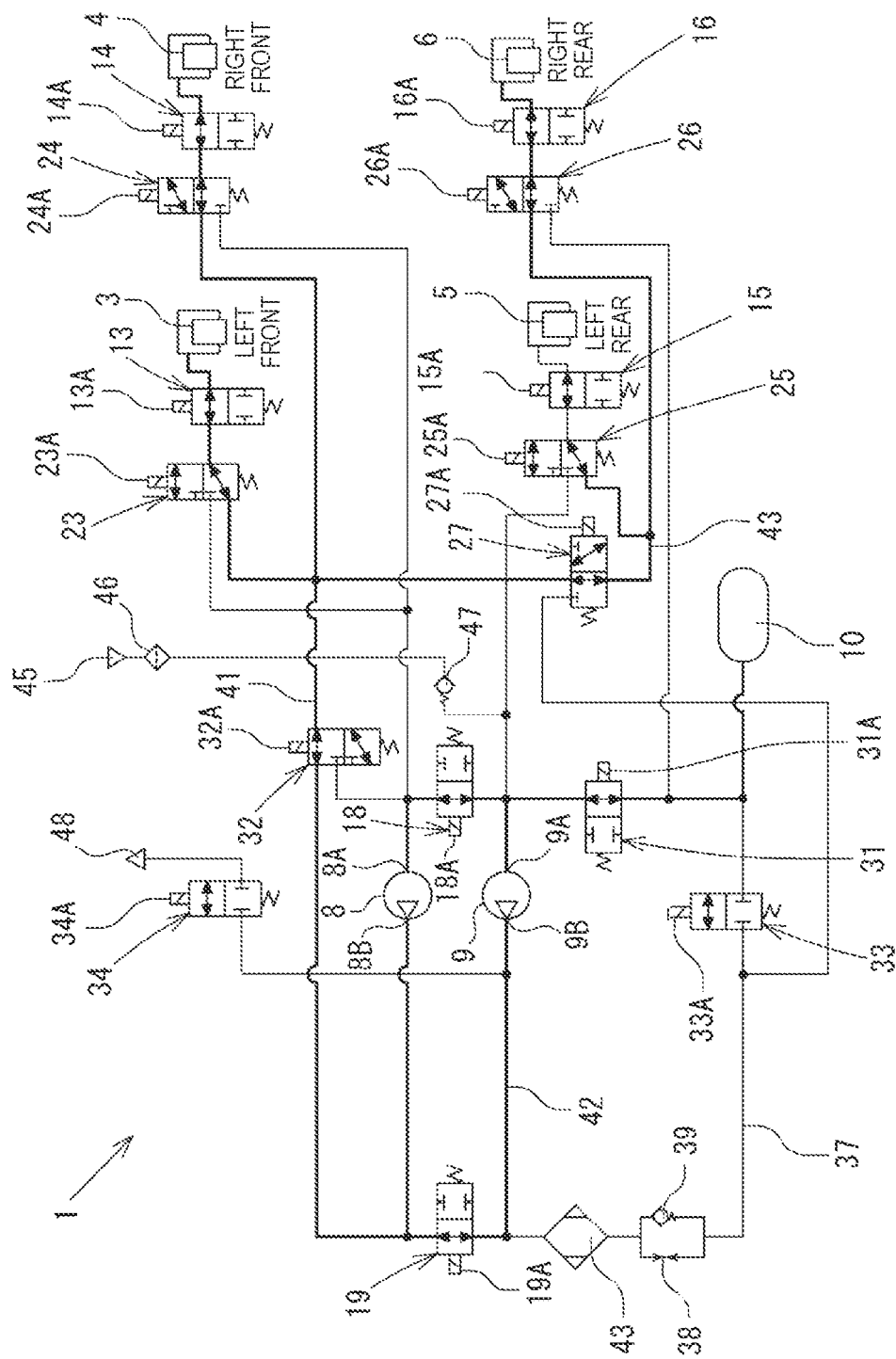
FIG. 4 is an explanatory diagram of the first embodiment which shows a diagram of the pneumatic system in an alternate mode (raising).

FIG. 4 is a diagram of the pneumatic system in an alternate raising mode of the above-mentioned alternate modes which raises the air suspensions 3 and 4 of the left and right front wheels and the air suspensions 5 and 6 of the left and right rear wheels alternately using the two compressors 8 and 9. Unlike the simultaneous mode (see FIG. 2), the alternate raising mode energizes the solenoid 19A of the control valve 19 to bring the air exhaust port 8B of the compressor 8 and the air exhaust port 9B of the compressor 9 into communication with each other and de-energizes the solenoid 27A of the control valve 27 to bring the duct line 41 into communication with a duct line 43 on a side of the air suspensions 5 and 6 of the left and right rear wheels.

According to the alternate raising mode, if the solenoids 13A and 14A of the control valves 13 and 14 are energized, and the solenoids 15A and 16A of the control valves 15 and 16 are de-energized, the vehicle height of the air suspensions 3 and 4 of the left and right front wheels can be raised using the two compressors 8 and 9. To the contrary, if the solenoids 15A and 16A of the control valves 15 and 16 are energized, and the solenoids 13A and 14A of the control valves 13 and 14 are de-energized, the vehicle height of the air suspensions 5 and 6 of the left and right rear wheels can be raised using the two compressors 8 and 9.

Figure 5:
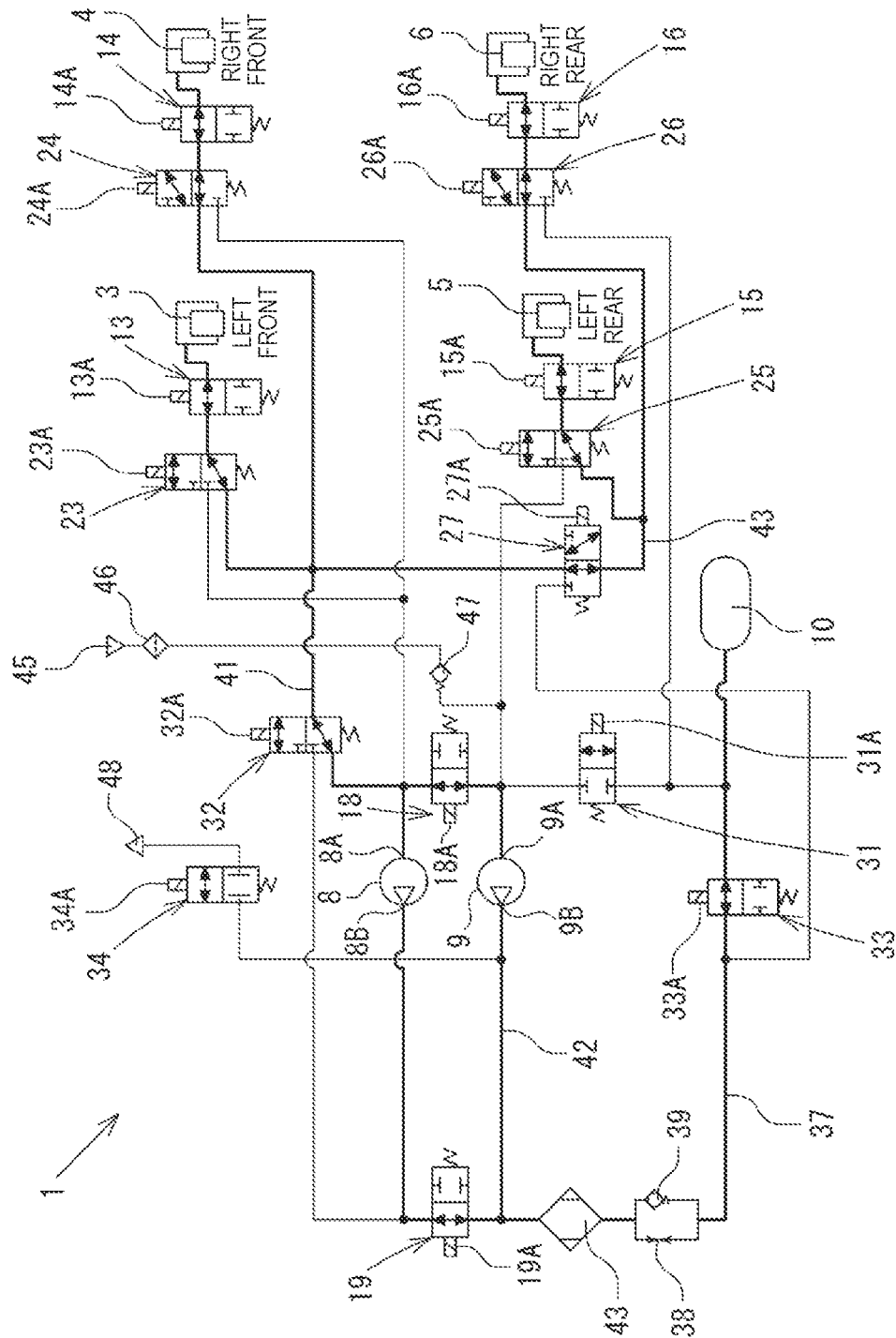
FIG. 5 is an explanatory diagram of the first embodiment which shows a diagram of the pneumatic system in an alternate mode (lowering).

FIG. 5 is a diagram of the pneumatic system in an alternate lowering mode of the above-mentioned alternate modes which lowers the air suspensions 3 and 4 of the left and right front wheels and the air suspensions 5 and 6 of the left and right rear wheels alternately using the two compressors 8 and 9. In this alternate lowering mode, the solenoid 19A of the control valve 19 and the solenoid 33A of the control valve 33 are energized to bring the air exhaust port 8B of the compressor 8 and the air exhaust port 9B of the compressor 9 into communication with the pressure accumulator 10, and the solenoid 18A of the control valve 18 is energized to bring the air supply port 8A of the compressor 8 and the air supply port 9A of the compressor 9 into communication with the duct line 41.

The alternate lowering mode energizes the solenoids 13A and 14A of the control valves 13 and 14 and de-energizes the solenoids 15A and 16A of the control valves 15 and 16 to discharge the compressed air of the air suspensions 3 and 4 of the left and right front wheels using the two compressors 8 and 9, to thereby lower the vehicle height of the air suspensions 3 and 4 of the left and right front wheels. The alternate lowering mode also energizes the solenoids 15A and 16A of the control valves 15 and 16 and de-energizes the solenoids 13A and 14A of the control valves 13 and 14 to discharge the compressed air of the air suspensions 5 and 6 of the left and right rear wheels using the two compressors 8 and 9, to thereby lower the vehicle height of the air suspensions 5 and 6 of the left and right rear wheels.

Figure 6:
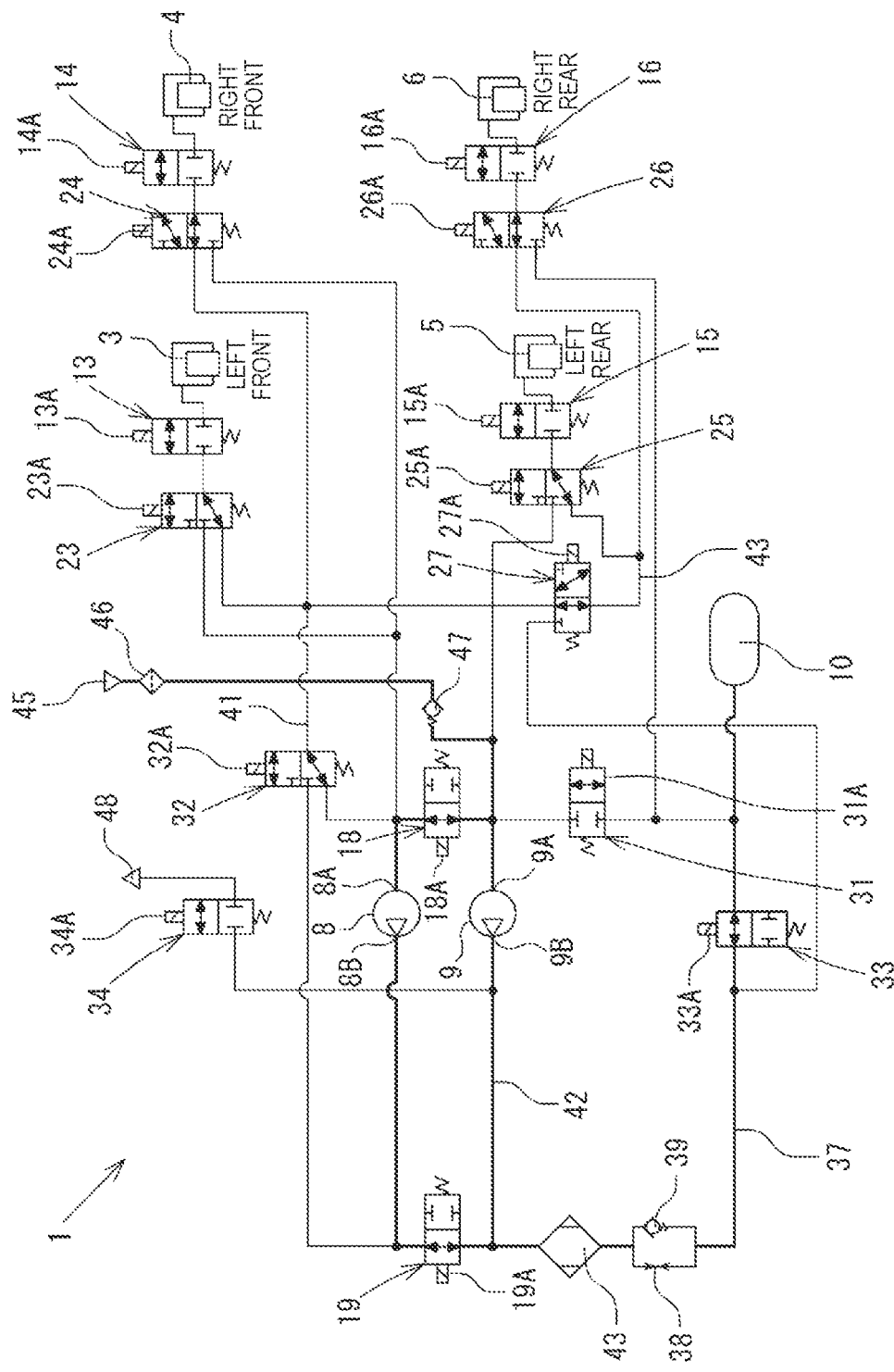
FIG. 6 is an explanatory diagram of the first embodiment which shows a diagram of the pneumatic system where a pressure accumulator is filled with compressed air.

FIG. 6 is a diagram of the pneumatic system where the pressure accumulator 10 is filled with compressed air. When detecting an insufficiency of internal pressure of the pressure accumulator 10, the suspension control device energizes the solenoid 18A of the control valve 18 to bring the air supply port 8A of the compressor 8 and the air supply port 9A of the compressor 9 into communication with each other and further energizes the solenoids 19A and 33A of the control valves 19 and 33 to bring the air exhaust port 8B of the compressor 8 and the air exhaust port 9B of the compressor 9 into communication with the pressure accumulator 10. If the two compressors 8 and 9 are activated in the above-described state, the air introduced through an atmospheric air inlet 45 fills the pressure accumulator 10 via a filter 46 and a check valve 47.

Figure 7:
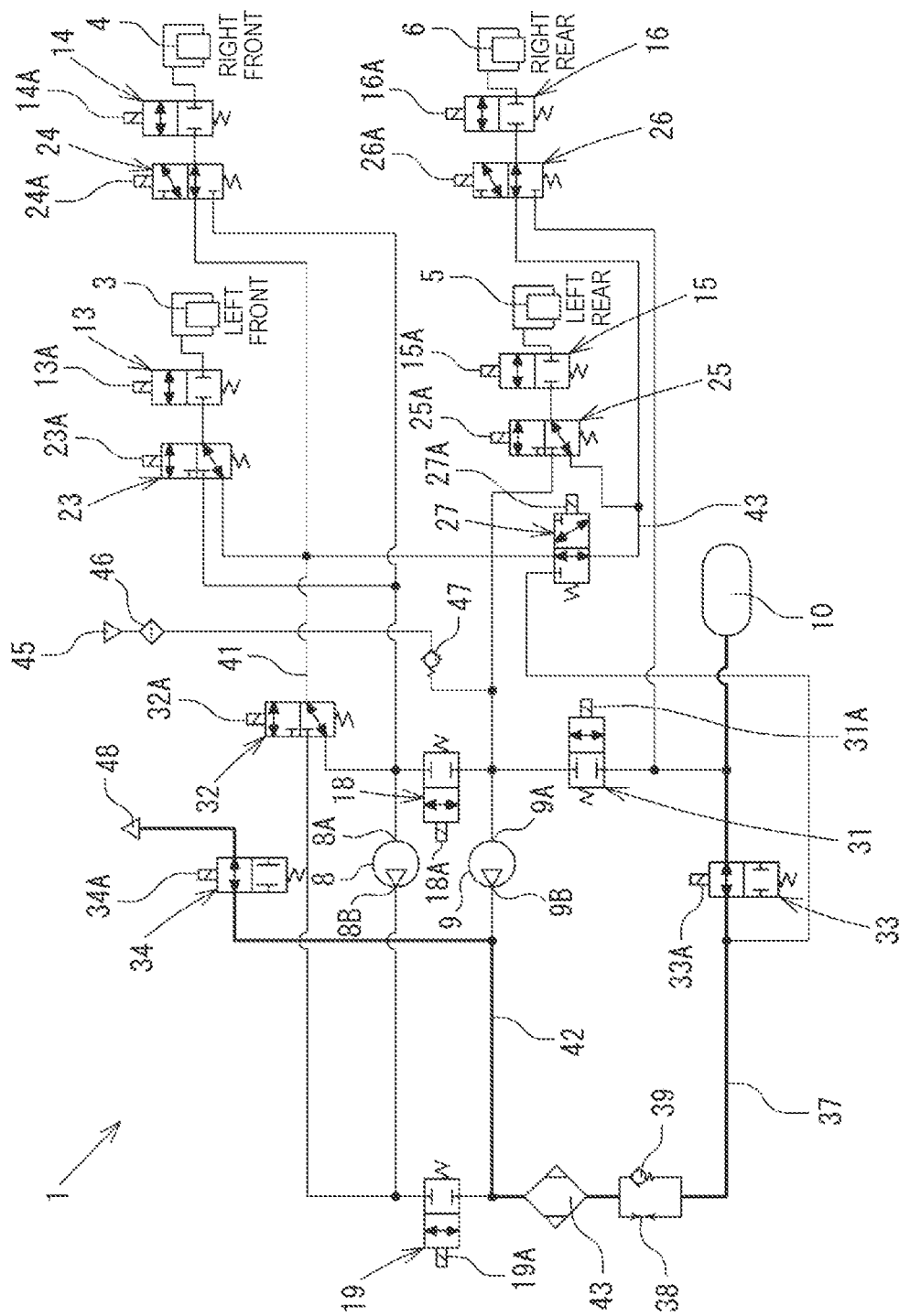
FIG. 7 is an explanatory diagram of the first embodiment which shows a diagram of the pneumatic system where the compressed air in the pressure accumulator is released into atmosphere.

FIG. 7 is a diagram of the pneumatic system where the compressed air in the pressure accumulator 10 is released into atmosphere. When detecting an excess of the internal pressure of the pressure accumulator 10, the suspension control device energizes the solenoids 33A and 34A of the control valves 33 and 34 to bring the pressure accumulator 10 into communication with the air outlet 48. The compressed air in the pressure accumulator 10 is then released into atmosphere through the air outlet 48. In this process, the compressed air discharged from the pressure accumulator 10 passes through the dryer 43 and thus dries a drying agent placed in the dryer 43, recovering a function as the dryer 43.

Figure 8:
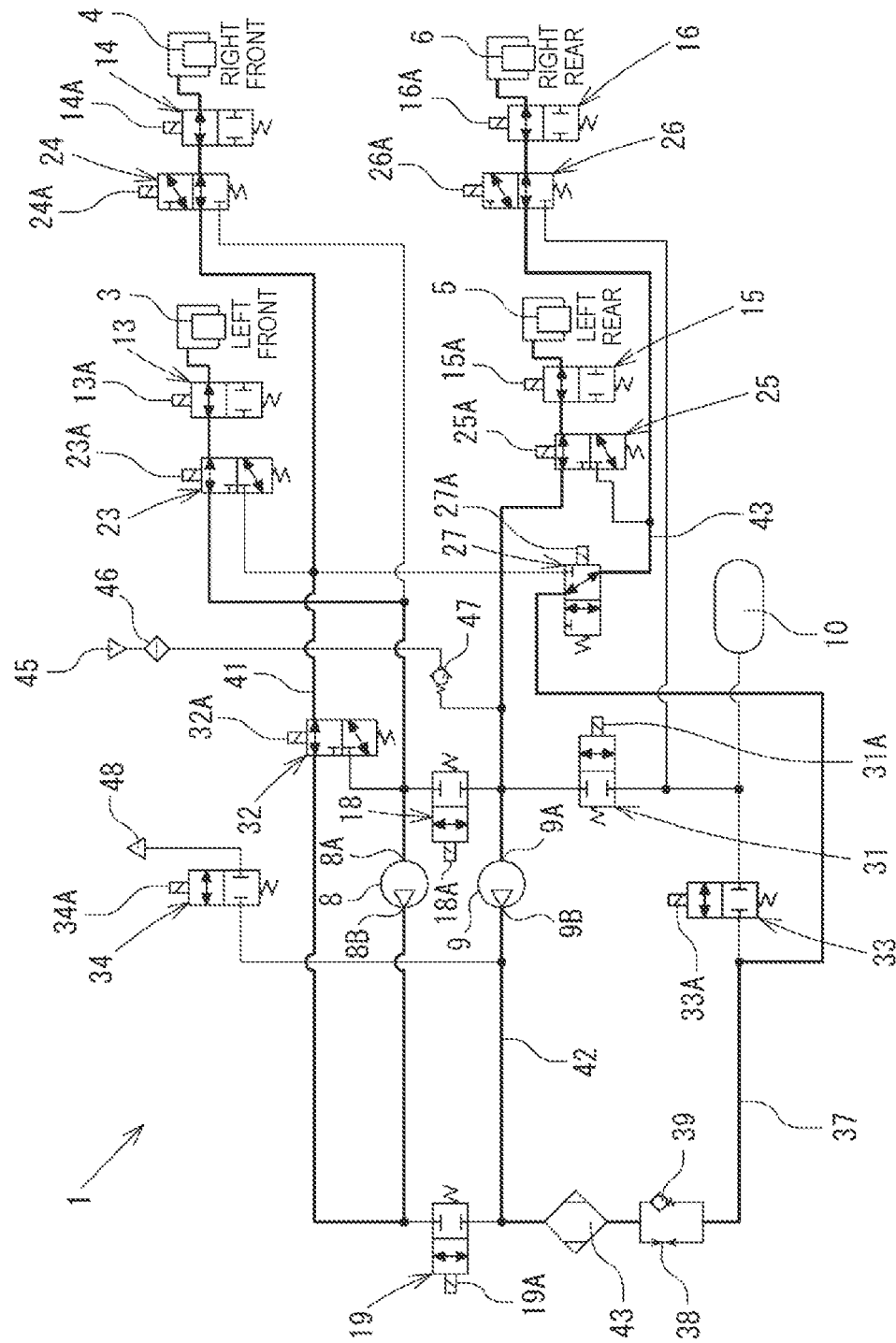
FIG. 8 is an explanatory diagram of the first embodiment which shows a diagram of the pneumatic system when a vehicle turns left in a counter roll mode.

FIG. 8 is a diagram of the pneumatic system when the vehicle turns left in a counter roll mode. During the left turn in the counter roll mode, the solenoids 13A and 23A of the control valves 13 and 23 are energized to bring the air suspension 3 of the left front wheel into communication with the air supply port 8A of the compressor 8, and the solenoids 14A and 32A of the control valves 14 and 32 are energized to bring the air suspension 4 of the right front wheel into communication with the air exhaust port 8B of the compressor 8. The compressed air of the air suspension 3 of the left front wheel (inner wheel during turn) is thus pumped to the air suspension 4 of the right front wheel (outer wheel during turn) using the compressor 8.

At the same time with the energization of the solenoids 13A and 23A of the control valves 13 and 23, the solenoids 15A and 25A of the control valves 15 and 25 are energized to bring the air suspension 5 of the left rear wheel into communication with the air supply port 9A of the compressor 9, and the solenoids 16A and 27A of the control valves 16 and 27 are also energized to bring the air suspension 6 of the right rear wheel into communication with the air exhaust port 9B of the compressor 9. The compressed air of the air suspension 5 of the left rear wheel (inner wheel during turn) is thus pumped to the air suspension 6 of the right rear wheel (outer wheel during turn) using the compressor 9.

Figure 9:
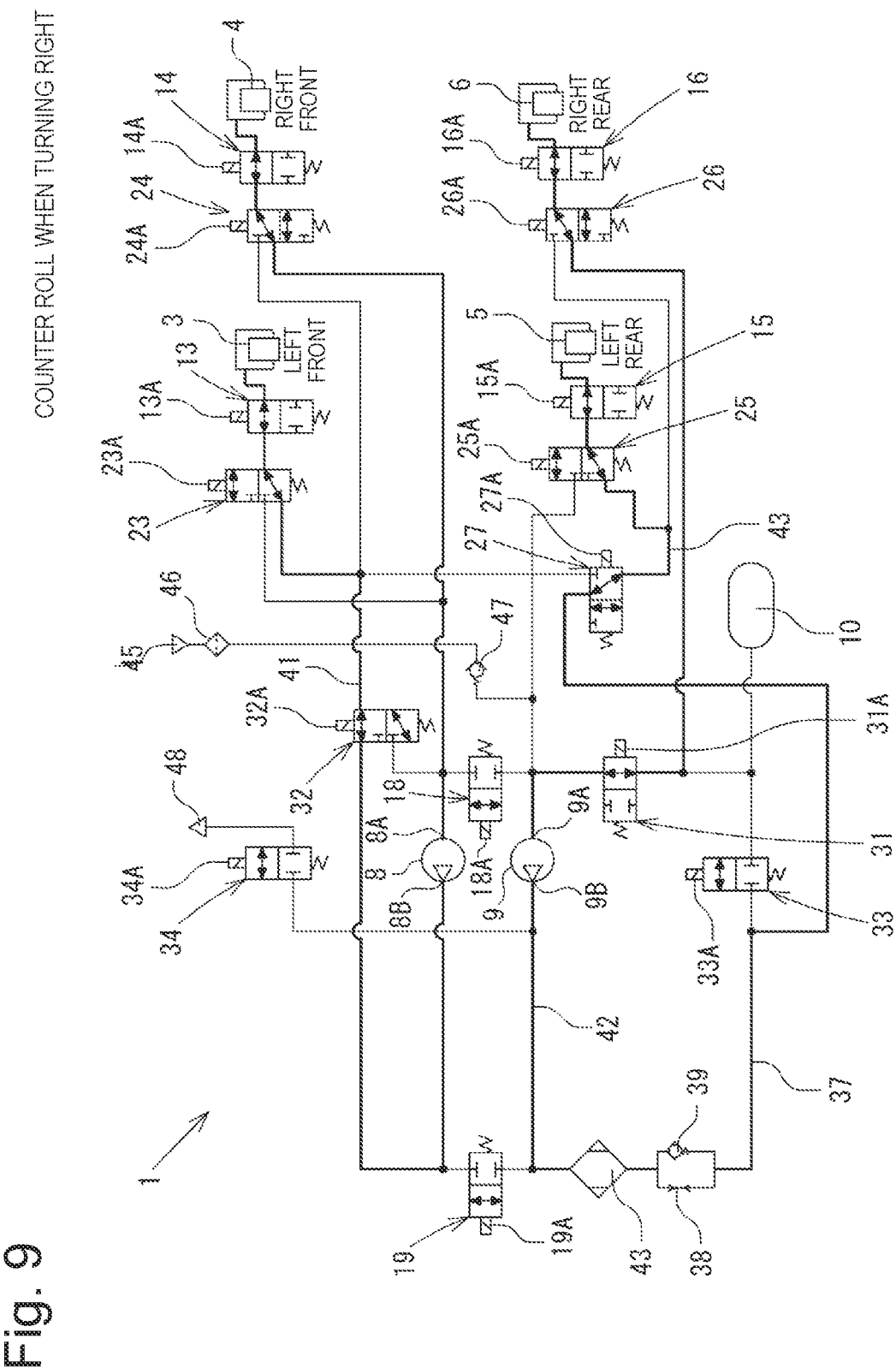
FIG. 9 is an explanatory diagram of the first embodiment which shows a diagram of the pneumatic system when the vehicle turns right in the counter roll mode.

FIG. 9 is a diagram of the pneumatic system when the vehicle turns right in the counter roll mode. When the vehicle turns right in the counter roll mode, the solenoids 14A and 24A of the control valves 14 and 24 are energized to bring the air suspension 4 of the right front wheel into communication with the air supply port 8A of the compressor 8, and the solenoids 13A and 32A of the control valves 13 and 32 are energized to bring the air suspension 3 of the left front wheel into communication with the air exhaust port 8B of the compressor 8. The compressed air of the air suspension 4 of the right front wheel (inner wheel during turn) is thus pumped to the air suspension 3 of the left front wheel (outer wheel during turn) using the compressor 8.

At the same time with the energization of the solenoids 14A and 24A of the control valves 14 and 24, the solenoids 16A and 26A of the control valves 16 and 26 are energized to bring the air suspension 6 of the right rear wheel into communication with the air supply port 9A of the compressor 9, and the solenoids 15A and 27A of the control valves 15 and 27 are also energized to bring the air suspension 5 of the left rear wheel into communication with the air exhaust port 9B of the compressor 9. The compressed air of the air suspension 6 of the right rear wheel (inner wheel during turn) is thus pumped to the air suspension 5 of the left rear wheel (outer wheel during turn) using the compressor 9.

In the counter roll mode, if either the vehicle height adjustment of the left and right front wheels or the vehicle height adjustment of the left and right rear wheels is finished earlier than the other, the solenoid 18A of the control valve 18 is energized to bring the air supply port 8A of the compressor 8 and the air supply port 9A of the compressor 9 into communication with each other, and the solenoid 19A of the control valve 19 is energized to bring the air exhaust port 8B of the compressor 8 and the air exhaust port 9B of the compressor 9 into communication with each other. This allows the two compressors 8 and 9 to quickly perform the rest of the other vehicle height adjustment.

When the suspension control device recognizes that a driving situation is a rolling state on the basis of curvature of a curve ahead which is obtained from wireless communication information (C2X, V2X) which includes an image signal of a vehicle-mounted camera (external recognition means), road-to-vehicle communication, and the like, and information including vehicle speed and the like that are obtained from a detection signal of vehicle condition detecting means, the suspension control device selects the counter roll mode. If the vehicle turns left, the compressed air of the air suspension 3 of the left front wheel is pumped to the air suspension 4 of the right front wheel using the compressor 8, and the compressed air of the air suspension 5 of the left rear wheel is pumped to the air suspension 6 of the right rear wheel using the compressor 9.

In short, the compressors 8 and 9 are used to force the compressed air of the air suspensions 3 and 5 of the inner wheels during turn into the air suspensions 4 and 6 of the outer wheels during turn. This lowers the vehicle height of the air suspensions 3 and 5 of the inner wheels during turn and simultaneously raises the vehicle height of the air suspensions 4 and 6 of the outer wheels during turn. The vehicle therefore gets into a counter roll position with the vehicle body inclined in a counter direction to an actual roll direction.

If the vehicle turns right, the compressed air of the air suspension 4 of the right front wheel is pumped to the air suspension 3 of the left front wheel using the compressor 8, and the compressed air of the air suspension 6 of the right rear wheel is pumped to the air suspension 5 of the left rear wheel using the compressor 9. In short, the compressors 8 and 9 are used to force the compressed air of the air suspensions 4 and 6 of the inner wheels during turn into the air suspensions 3 and 5 of the outer wheels during turn. This lowers the vehicle height of the air suspensions 4 and 6 of the inner wheels during turn and simultaneously raises the vehicle height of the air suspensions 3 and 5 of the outer wheels during turn. The vehicle therefore gets into a counter roll position with the vehicle body inclined in a counter direction to an actual roll direction.

The suspension control device is connected via CAN (Controller Area Network) to other control devices (ECUs) provided in the vehicle which include a control device for the vehicle-mounted camera. The suspension control device is therefore capable of communicating with the other control devices through CAN signals. However, in-vehicle LAN communication does not necessarily have to be made through CAN.

According to the suspension device shown in the Patent Literature 1, communication between the air suspensions of the front wheels and the air suspensions of the rear wheels causes pressure (compressed air) to escape from the air suspensions having relatively higher pressure to the air suspensions having low pressure. When the counter roll control is carried out, therefore, it is necessary to adjust the vehicle height of the air suspensions of the front wheels and the air suspensions of the rear wheels alternately, which causes a problem with responsiveness. Furthermore, not only the front and rear air suspensions but the left and right air suspensions need to be alternately adjusted in vehicle height, which also causes a problem with responsiveness.

To solve the problem, according to the first embodiment, when the vehicle's driving situation is the rolling state, the compressed air is transferred between the left and right air suspensions 3 and 4 of the front wheels using the compressor 8, and the compressed air is transferred between the left and right air suspensions 5 and 6 of the rear wheels using the compressor 9, to thereby cause the air suspensions 3 and 4 of the left and right front wheels and the air suspensions 5 and 6 of the left and right rear wheels to independently generate counter rolls. The first embodiment concurrently performs the vehicle height adjustment of the air suspensions 3 and 4 of the left and right front wheels and the vehicle height adjustment of the air suspensions 5 and 6 of the left and right rear wheels as described above, improving the responsiveness in the counter roll control.

Operation and advantageous effects of the first embodiment will be now discussed.

The first embodiment provides the suspension device comprising the front wheel-side left and right air suspensions, the rear wheel-side left and right air suspensions, and the compressor configured to supply the compressed air to the front wheel-side air suspensions and the rear wheel-side air suspensions. When the vehicle's driving situation is the rolling state, the compressed air is transferred between the left and right air suspensions using the compressor so that the front wheel-side air suspensions and the rear wheel-side air suspensions independently generate the counter rolls. This makes it possible to concurrently perform the vehicle height adjustment of the front wheel-side air suspensions and the rear wheel-side air suspensions, which improves the responsiveness in the counter roll control of the suspension device comprising the air suspensions.

According to the first embodiment, the compressor comprises the first compressor configured to supply the compressed air to the front wheel-side air suspensions and the second compressor configured to supply the compressed air to the rear wheel-side air suspensions. If either the compressed air transfer between the front wheel-side left and right air suspensions using the first compressor or the compressed air transfer between the rear wheel-side left and right air suspensions using the second compressor is finished earlier than the other, the two compressors including the first and second compressors are used to carry out the rest of the transfer between the other wheel-side left and right air suspensions. This reduces the time required to carry out the rest of the compressed air transfer between the other wheel-side left and right air suspensions.

According to the first embodiment, the driving situation is recognized on the basis of vehicle communication signals of the CAN or the like which are obtained from the information of the external recognition means and the wireless communication information. The counter roll in the suspension device according to the invention is therefore applicable to a self-driving vehicle.

According to the first embodiment, the suspension control device recognizes that the driving situation is the rolling state on the basis of the image signal (information) obtained from the vehicle-mounted camera (external recognition means) and the wireless communication information, such as the road-to-vehicle communication. The suspension control device may also be configured to recognize that the driving situation is the rolling state on the basis of a detection result of vehicle height detecting means that detects or estimates vehicle height. In such a case, a conventional vehicle control logic is used as a logic for determining the driving situation from the detected or estimated vehicle height.

(Second Embodiment) A second embodiment of the invention will be discussed below with reference to the attached drawings.

Components similar to those of the first embodiment will be provided with the same designations and reference numerals, and overlapping explanations will be omitted.

According to the first embodiment, when the vehicle height is lowered, the two compressors 8 and 9 are used to lower the air suspensions 3 and 4 of the left and right front wheels and the air suspensions 5 and 6 of the left and right rear wheels alternately. The second embodiment, however, lowers vehicle height without using compressors 8 and 9. Internal pressure of a pressure accumulator 10 is therefore set lower than pressure of an air spring of each of air suspensions 3, 4, 5 and 6.

Figure 10:
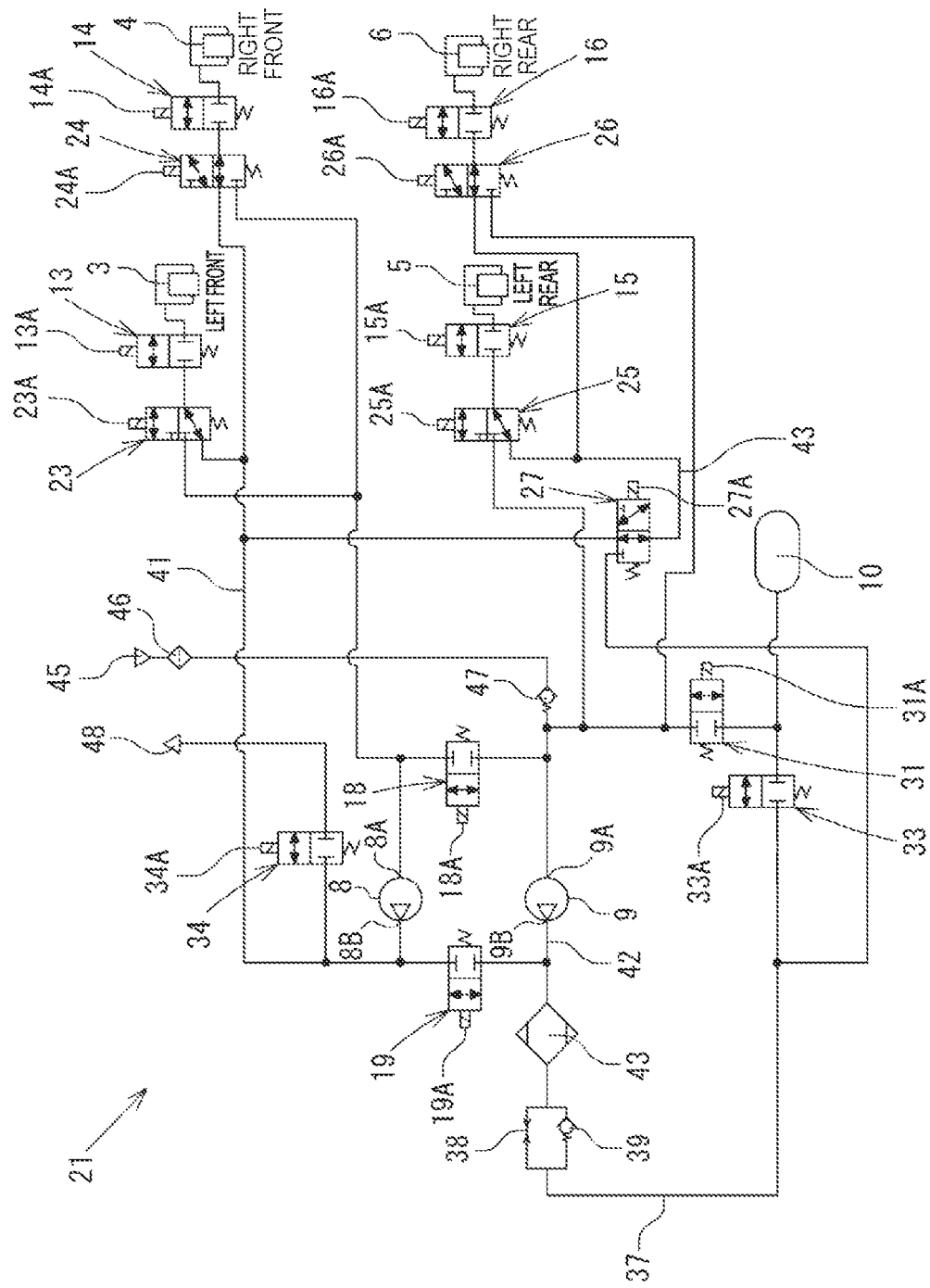
FIG. 10 is a diagram showing a pneumatic system of a suspension device according to a second embodiment.

FIG. 10 is a pneumatic system diagram of a suspension device 21 according to the second embodiment. The suspension device 21 is not provided with the control valve 32 (see FIG. 1) that is used in the suspension device 1 according to the first embodiment. The suspension device 21 includes a throttle valve 38 and a check valve 39 provided in parallel in a duct line 37 extending between an air exhaust port 9B of the compressor 9 (second compressor) and the pressure accumulator 10.

Figure 11:
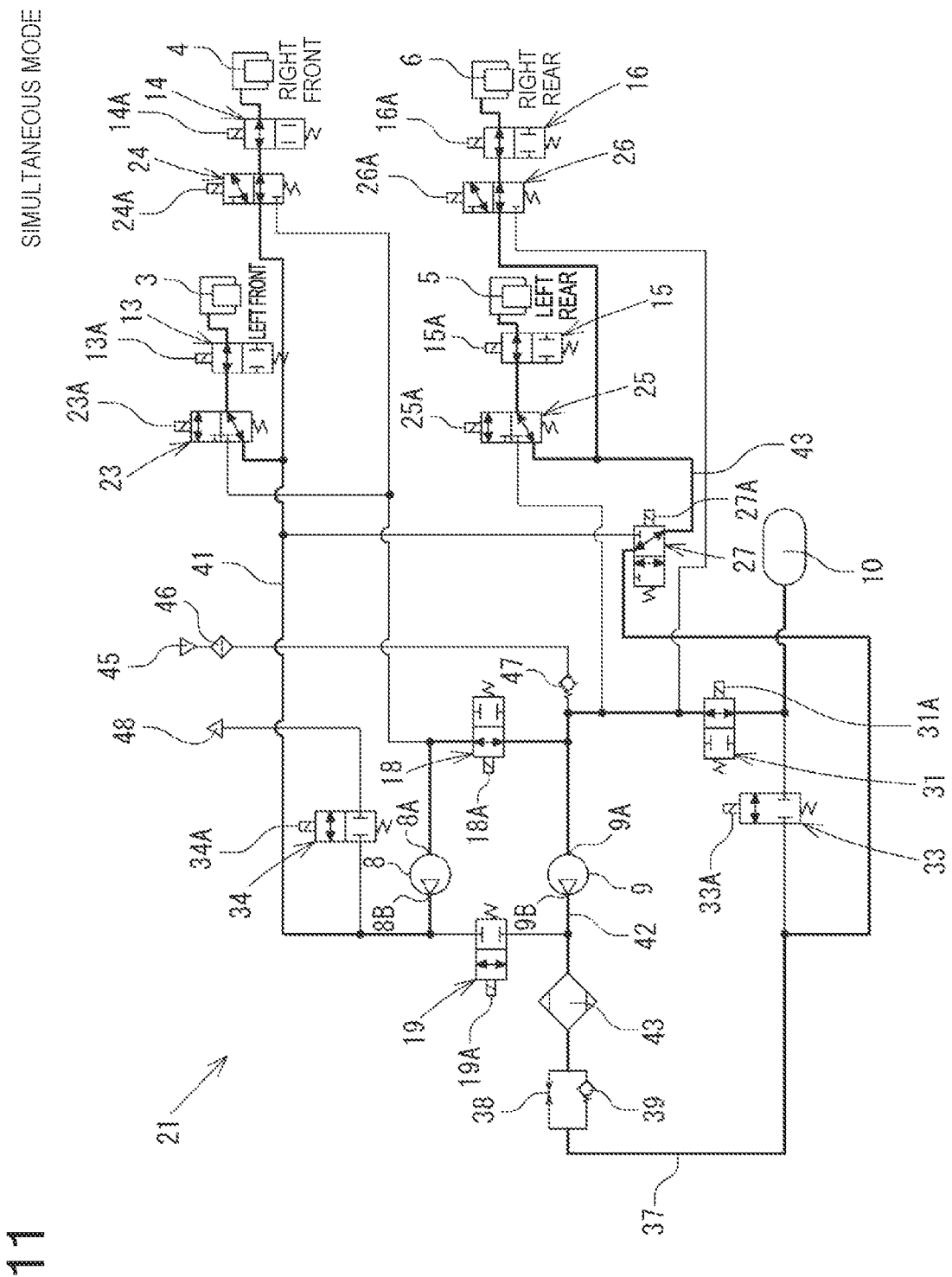
FIG. 11 is an explanatory diagram of the second embodiment which shows a diagram of the pneumatic system in a simultaneous mode.

FIG. 11 is a diagram of the pneumatic system in a simultaneous mode in the suspension device 21. In the simultaneous mode, a solenoid 31A of a control valve 31 and a solenoid 18A of a control valve 18 are energized to bring an air supply port 8A of the compressor 8 and an air supply port 9A of the compressor 9 into communication with the pressure accumulator 10. A solenoid 19A of a control valve 19 is de-energized to disconnect an air exhaust port 8B of the compressor 8 and the air exhaust port 9B of the compressor 9 from each other. Furthermore, a solenoid 13A of a control valve 13 and a solenoid 14A of a control valve 14 are energized to bring the air exhaust port 8B of the compressor 8 into communication with the air suspensions 3 and 4. Compressed air that is pumped from the compressor 8 is thus supplied to the air suspensions 3 and 4 of the left and right front wheels, to thereby raise vehicle height of the air suspensions 3 and 4.

A solenoid 27A of a control valve 27, a solenoid 15A of a control valve 15, and a solenoid 16A of a control valve 16 are energized to bring the air exhaust port 9B of the compressor 9 into communication with the air suspensions 5 and 6. Compressed air that is pumped from the compressor 9 is thus supplied to the air suspensions 5 and 6 of the left and right rear wheels, to thereby raise vehicle height of the air suspensions 5 and 6.

If vehicle height adjustment (raising) of the air suspensions 5 and 6 of the left and right rear wheels is finished earlier, the solenoid 19A of the control valve 19 is energized to bring the air exhaust port 8B of the compressor 8 and the air exhaust port 9B of the compressor 9 into communication with each other. The air suspensions 3 and 4 of the left and right front wheels are thus supplied with the compressed air that is pumped from the compressor 8 and the compressed air that is pumped from the compressor 9. This increases speed of the rest of the raising motion of the air suspensions 3 and 4 of the left and right front wheels.

If vehicle height adjustment (raising) of the air suspensions 3 and 4 of the left and right front wheels is finished earlier, the solenoid 19A of the control valve 19 is energized to bring the air exhaust port 8B of the compressor 8 and the air exhaust port 9B of the compressor 9 into communication with each other. The air suspensions 5 and 6 of the left and right rear wheels are thus supplied with the compressed air that is pumped from the compressor 8 and the compressed air that is pumped from the compressor 9. This increases speed of the rest of the raising motion of the air suspensions 5 and 6 of the left and right rear wheels.

If the air suspensions 3 and 4 of the left and right front wheels and the air suspensions 5 and 6 of the left and right rear wheels are alternately raised using the two compressors 8 and 9, unlike the simultaneous mode (see FIG. 11), the solenoid 19A of the control valve 19 is energized to bring the air exhaust port 8B of the compressor 8 and the air exhaust port 9B of the compressor 9 into communication with each other, and the solenoid 27A of the control valve 27 is de-energized to bring a duct line 41 into communication with a duct line 43 on a side of the air suspensions 5 and 6 of the left and right rear wheels.

The vehicle height of the air suspensions 3 and 4 of the left and right front wheels can be raised using the two compressors 8 and 9 by energizing the solenoids 13A and 14A of the control valves 13 and 14. The vehicle height of the air suspensions 5 and 6 of the left and right rear wheels can be raised using the two compressors 8 and 9 by energizing the solenoids 15A and 16A of the control valves 15 and 16.

Figure 12:
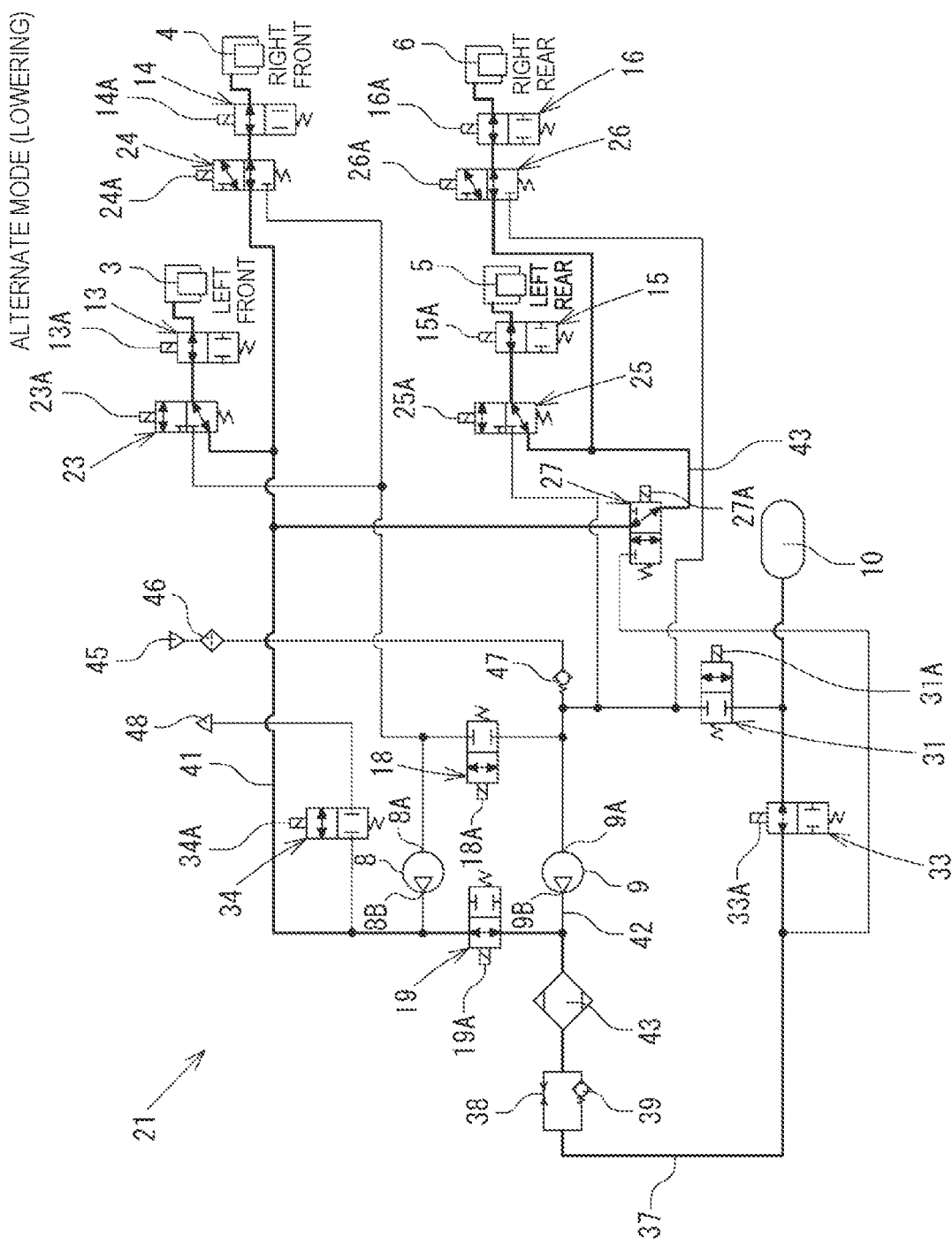
FIG. 12 is an explanatory diagram of the second embodiment which shows a diagram of the pneumatic system in an alternate mode (lowering).

FIG. 12 shows the pneumatic system where the air suspensions 3 and 4 of the left and right front wheels and the air suspensions 5 and 6 of the left and right rear wheels are alternately lowered. An alternate lowering mode of the second embodiment energizes the solenoid 19A of the control valve 19 and a solenoid 33A of a control valve 33 to bring the duct line 41 into communication with the pressure accumulator 10.

The solenoids 13A and 14A of the control valves 13 and 14 are energized to store the compressed air of the air suspensions 3 and 4 of the left and right front wheels in the pressure accumulator 10, which lowers the vehicle height of the air suspensions 3 and 4 of the left and right front wheels. The solenoids 15A and 16A of the control valves 15 and 16 are energized to store the compressed air of the air suspensions 5 and 6 of the left and right rear wheels in the pressure accumulator 10, which lowers the vehicle height of the air suspensions 5 and 6 of the left and right rear wheels.

Figure 13:
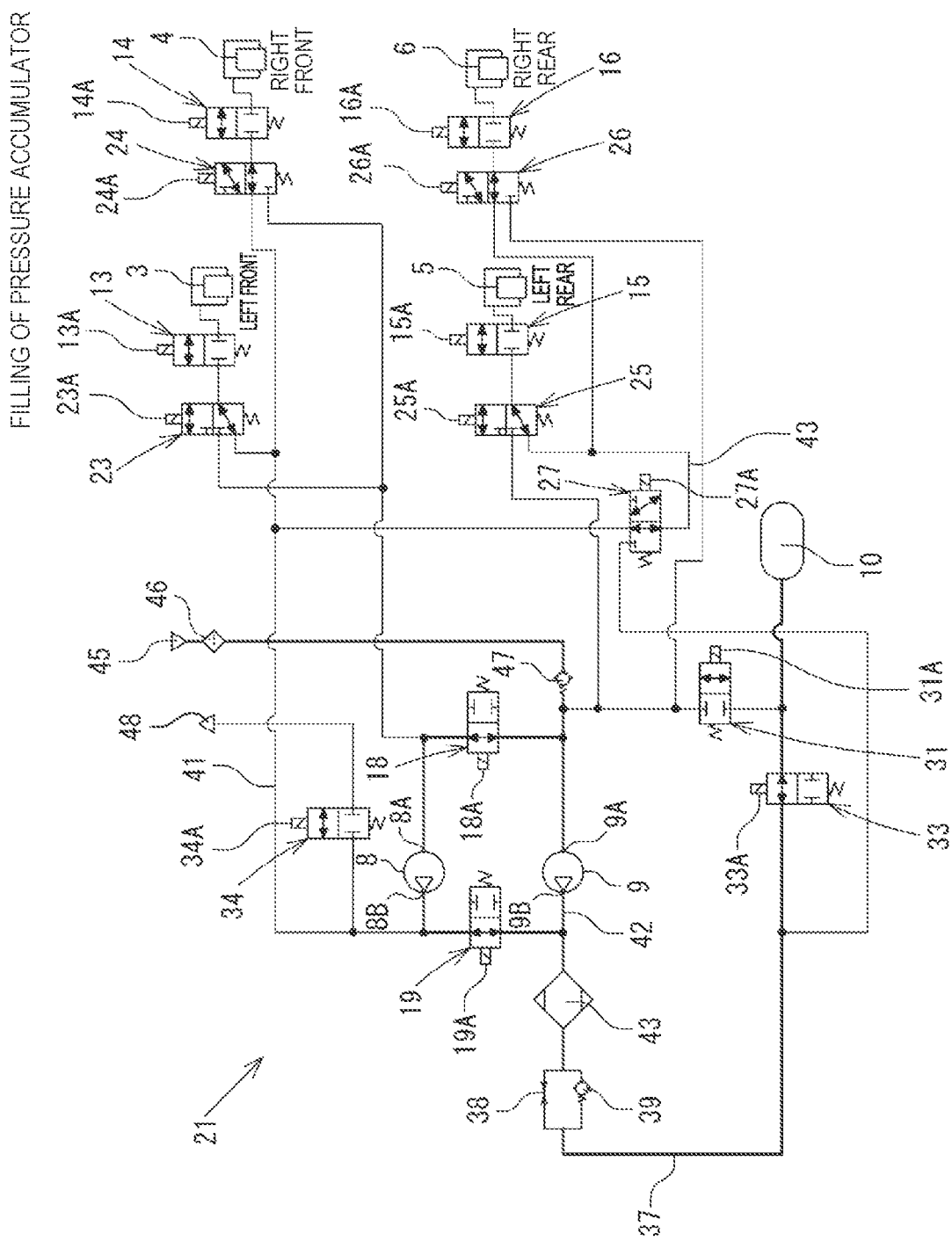
FIG. 13 is an explanatory diagram of the second embodiment which shows a diagram of the pneumatic system where a pressure accumulator is filled with compressed air.

FIG. 13 shows the pneumatic system where the pressure accumulator 10 is filled with the compressed air. When detecting an insufficiency of internal pressure of the pressure accumulator 10, the suspension control device energizes the solenoid 18A of the control valve 18 to bring the air supply port 8A of the compressor 8 and the air supply port 9A of the compressor 9 into communication with each other and energizes the solenoids 19A and 33A of the control valves 19 and 33 to bring the air exhaust port 8B of the compressor 8 and the air exhaust port 9B of the compressor 9 into communication with the pressure accumulator 10. If the two compressors 8 and 9 are activated in the above-described state, the air introduced through an atmospheric air inlet 45 fills the pressure accumulator 10 via a filter 46, a check valve 47, a dryer 43, a throttle valve 38, and a check valve 39.

Figure 14:
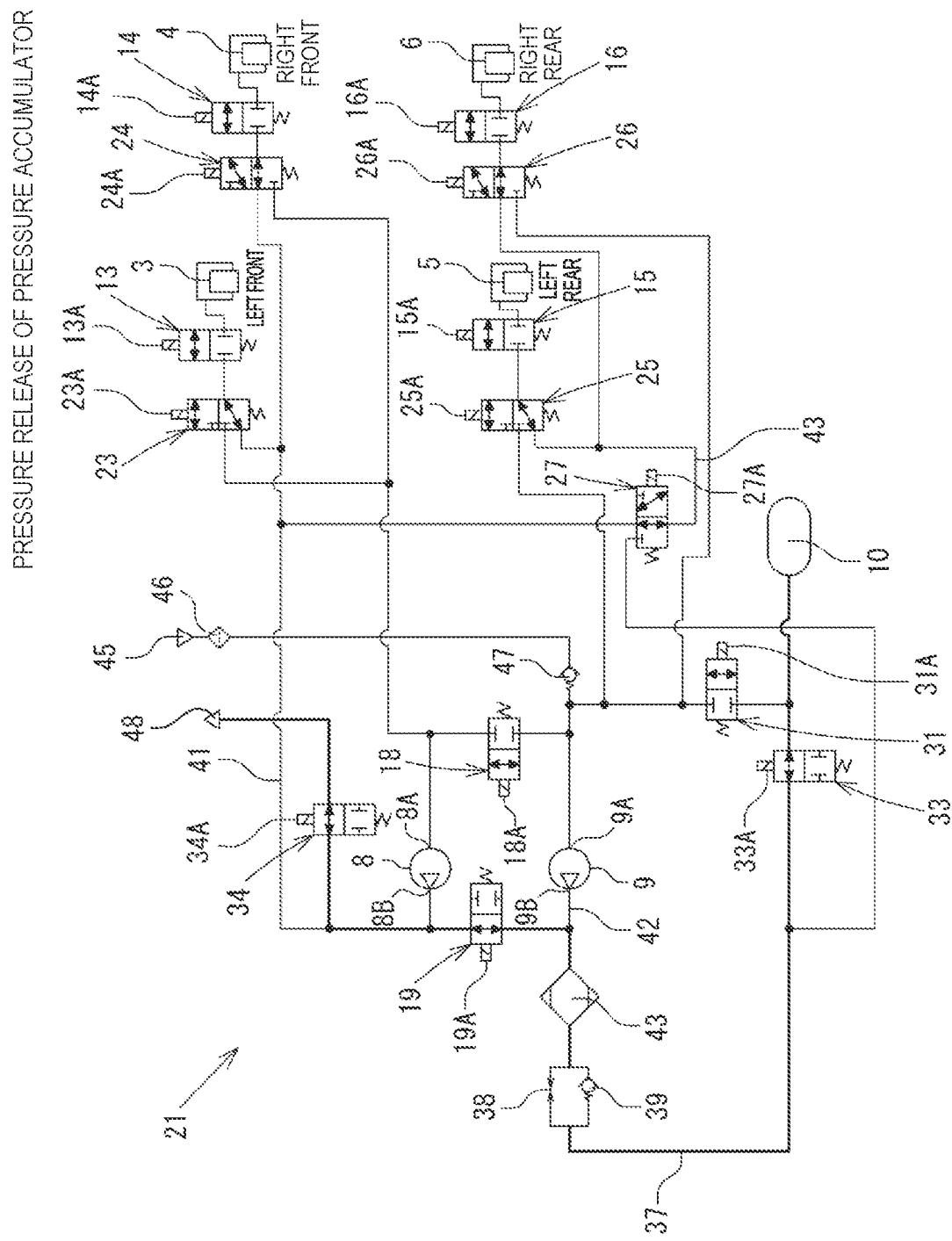
FIG. 14 is an explanatory diagram of the second embodiment which shows a diagram of the pneumatic system where the compressed air in the pressure accumulator is released into atmosphere.

FIG. 14 shows the pneumatic system where the compressed air in the pressure accumulator 10 is released into atmosphere. When detecting an excess of internal pressure of the pressure accumulator 10, the suspension control device energizes the solenoids 19A, 33A and 34A of the control valves 19, 33 and 34 to bring the pressure accumulator 10 into communication with an air outlet 48. The compressed air of the pressure accumulator 10 is then released into atmosphere through the air outlet 48. In this process, the compressed air discharged from the pressure accumulator 10 passes through the dryer 43, which dries a drying agent placed in the dryer 43, recovering a function as the dryer 43.

Figure 15:
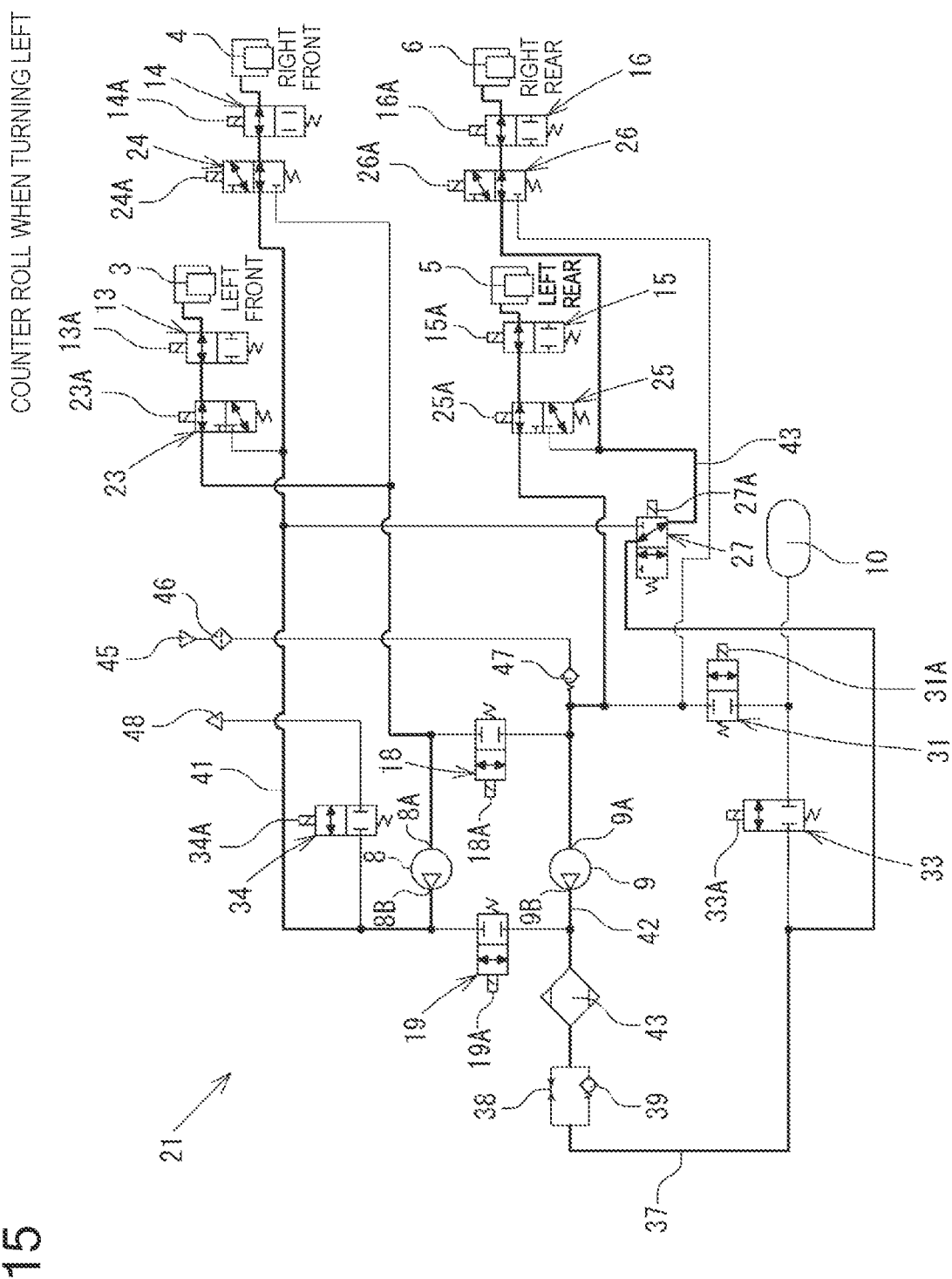
FIG. 15 is an explanatory diagram of the second embodiment which shows a diagram of the pneumatic system when a vehicle turns left in a counter roll mode.

FIG. 15 shows the pneumatic system when the vehicle turns left in the counter roll mode in the suspension device 21. During the left turn in the counter roll mode, the suspension control device energizes the solenoids 13A and 23A of the control valves 13 and 23 to bring the air suspension 3 of the left front wheel into communication with the air supply port 8A of the compressor 8 and further energizes the solenoid 14A of the control valve 14 to bring the air suspension 4 of the right front wheel into communication with the air exhaust port 8B of the compressor 8. This allows the compressor 8 to be used to pump the compressed air of the air suspension 3 of the left front wheel (inner wheel during turn) to the air suspension 4 of the right front wheel (outer wheel during turn).

At the same time with the energization of the solenoids 13A and 23A of the control valves 13 and 23, the suspension control device energizes the solenoid 15A of the control valve 15 and a solenoid 25A of a control valve 25 to bring the air suspension 5 of the left rear wheel into communication with the air supply port 9A of the compressor 9 and energizes the solenoids 16A and 27A of the control valves 16 and 27 to bring the air suspension 6 of the right rear wheel into communication with the air exhaust port 9B of the compressor 9. This allows the compressor 9 to be used to pump the compressed air of the air suspension 5 of the left rear wheel (inner wheel during turn) to the air suspension 6 of the right rear wheel (outer wheel during turn).

As described, when the vehicle turns left in the counter roll mode, the compressors 8 and 9 are used to force the compressed air of the air suspensions 3 and 5 of the inner wheels during turn into the air suspensions 4 and 6 of the outer wheels during turn. This lowers the vehicle height of the air suspensions 3 and 5 of the inner wheels during turn and raises the vehicle height of the air suspensions 4 and 6 of the outer wheels during turn. The vehicle therefore gets into a counter roll position with the vehicle body inclined in a counter direction to an actual roll direction.

Figure 16:
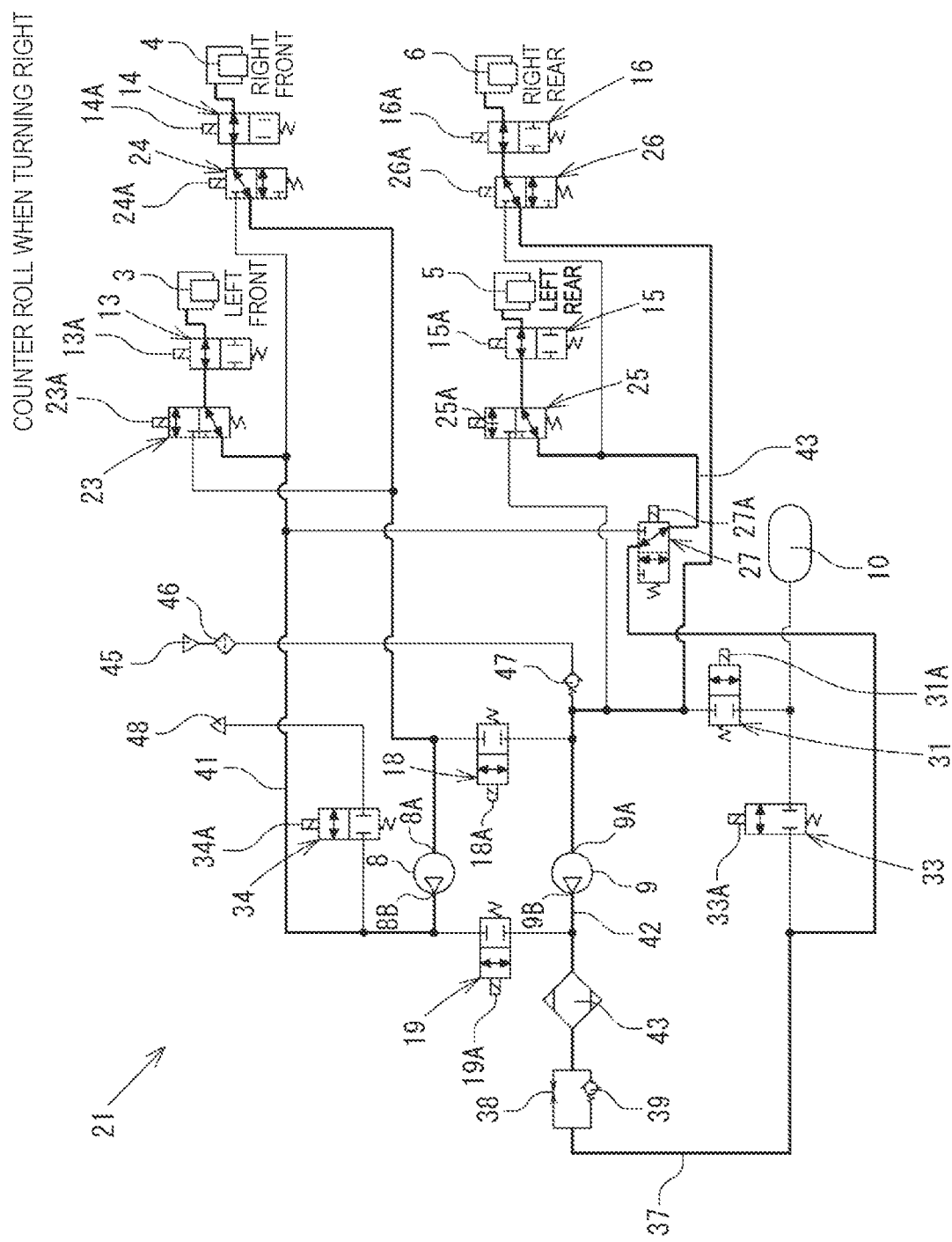
FIG. 16 is an explanatory diagram of the second embodiment which shows a diagram of the pneumatic system when the vehicle turns right in the counter roll mode.

FIG. 16 shows the pneumatic system when the vehicle turns right in the counter roll mode in the suspension control device 21. During the right turn in the counter roll mode, the suspension control device energizes the solenoid 14A of the control valve 14 and a solenoid 24A of a control valve 24 to bring the air suspension 4 of the right front wheel into communication with the air supply port 8A of the compressor 8 and further energizes the solenoid 13A of the control valve 13 to bring the air suspension 3 of the left front wheel into communication with the air exhaust port 8B of the compressor 8. This allows the compressor 8 to be used to pump the compressed air of the air suspension 4 of the right front wheel (inner wheel during turn) to the air suspension 3 of the left right wheel (outer wheel during turn).

At the same time with the energization of the solenoids 14A and 24A of the control valves 14 and 24, the suspension control device energizes the solenoid 16A of the control valve 16 and a solenoid 26A of a control valve 26 to bring the air suspension 6 of the right rear wheel into communication with the air supply port 9A of the compressor 9 and further energizes the solenoids 15A and 27A of the control valves 15 and 27 to bring the air suspension 5 of the left rear wheel into communication with the air exhaust port 9B of the compressor 9. This allows the compressor 9 to be used to pump the compressed air of the air suspension 6 of the right rear wheel (inner wheel during turn) to the air suspension 5 of the left rear wheel (outer wheel during turn).

As described, when the vehicle turns right in the counter roll mode, the compressors 8 and 9 are used to force the compressed air of the air suspensions 4 and 6 of the inner wheels during turn into the air suspensions 3 and 5 of the outer wheels during turn. This lowers the vehicle height of the air suspensions 4 and 6 of the inner wheels during turn and raises the vehicle height of the air suspensions 3 and 5 of the outer wheels during turn. The vehicle therefore gets into a counter roll position with the vehicle body inclined in a counter direction to an actual roll direction.

In the counter roll mode, if either the vehicle height adjustment of the left and right front wheels or the vehicle height adjustment of the left and right rear wheels is finished earlier that the other vehicle height adjustment, the solenoid 18A of the control valve 18 is energized to bring the air supply port 8A of the compressor 8 and the air supply port 9A of the compressor 9 into communication with each other, and the solenoid 19A of the control valve 19 is energized to bring the air exhaust port 8B of the compressor 8 and the air exhaust port 9B of the compressor 9 into communication with each other. This allows the two compressors 8 and 9 to quickly perform the rest of the other vehicle height adjustment.

The second embodiment provides operation and advantageous effects which are equivalent to those of the first embodiment. The second embodiment makes it possible to omit the control valve 32 of the first embodiment. This reduces the number of targets to be controlled by the suspension control device and therefore facilitates the control.

The invention is not limited to the above-discussed embodiments and may be modified in various ways. For example, the embodiments are intended to describe the invention in detail for easy understanding and do not necessarily have to include all the configurations mentioned above. The configuration of each embodiment may be partially replaced with another configuration or incorporated with another configuration. It is also possible to incorporate, omit or replace a part of the configuration of one of the embodiments into, from or with the configuration of another one of the embodiments.

The present application claims priority under Japanese Patent Application No. 2018-160619 filed on Aug. 29, 2018. The entire disclosure of Japanese Patent Application No.

2018-160619 filed on Aug. 29, 2018 including the description, claims, drawings and abstract, is incorporated herein by reference in its entirety.

REFERENCE SIGN LIST

1 Suspension device
2, 3 Air suspension (front wheel-side left and right air suspensions)
4, 5 Air suspension (rear wheel-side left and right air suspensions)
8 Compressor (first compressor)
9 Compressor (second compressor)

The invention claimed is:
1. A suspension device comprising:
a front wheel-side left air suspension;
a front wheel-side right air suspension;
a rear wheel-side left air suspension;
a rear wheel-side right air suspension; and
a compressor configured to supply compressed air to the front wheel-side left air suspension, the front wheel-side right air suspension, the rear wheel-side left air suspension, and the rear wheel-side right air suspension;
the compressor being used to transfer compressed air between the front wheel-side left air suspension and the front wheel-side right air suspension and to transfer compressed air between the rear wheel-side left air suspension and the rear wheel-side right air suspension so that, when a vehicle's driving situation is a rolling state, the front wheel-side left and right air suspensions and the rear wheel-side left and right air suspensions independently generate counter rolls by which a vehicle body is inclined in a counter direction to the rolling state,
wherein the compressor comprises:
a first compressor configured to supply compressed air to the front wheel-side left and right air suspensions; and
a second compressor configured to supply compressed air to the rear wheel-side left and right air suspensions, and
wherein when either the compressed air transfer between the front wheel-side left and right air suspensions using the first compressor or the compressed air transfer between the rear wheel-side left and right air suspensions using the second compressor is finished earlier than the other, the two compressors including the first and second compressors are used to carry out the rest of the compressed air transfer between the other wheel-side left and right air suspensions.
2. The suspension device according to claim 1,
wherein the driving situation is recognized based on a CAN signal obtained from information of external recognition means.
3. The suspension device according to claim 1,
wherein the driving situation is recognized based on a detection result of vehicle height detecting means that detects or estimates vehicle height.
4. The suspension device according to claim 1,
wherein the driving situation is recognized based on a CAN signal obtained from information of external recognition means.
5. The suspension device according to claim 1,
wherein the driving situation is recognized based on a detection result of vehicle height detecting means that detects or estimates vehicle height.

* * * * *